United States Patent [19]

Gilbreath et al.

[11] Patent Number: 5,133,185
[45] Date of Patent: Jul. 28, 1992

[54] ANTI-MOISTURE DEVICE FOR ENGINE EXHAUST

[75] Inventors: Jerry W. Gilbreath, Santa Ana; Phillip R. Day, Hesperia, both of Calif.

[73] Assignee: Ohio Associated Enterprises, Painesville, Ohio

[21] Appl. No.: 520,630

[22] Filed: May 7, 1990

[51] Int. Cl.⁵ .............................................. F01N 3/02
[52] U.S. Cl. ...................................... 60/309; 138/40; 440/89
[58] Field of Search ................ 60/309, 324, 312, 310; 440/89; 138/40, 42

[56] References Cited

U.S. PATENT DOCUMENTS

| | | | |
|---|---|---|---|
| 1,866,829 | 7/1932 | Welling | 138/40 |
| 2,168,528 | 8/1939 | Kadenacy | 60/324 |
| 2,717,049 | 9/1955 | Langford | 60/309 |
| 2,856,962 | 10/1958 | Christoph | 138/42 |
| 3,132,670 | 5/1964 | David | 138/40 |
| 3,426,526 | 2/1969 | Tornmarck | 60/309 |
| 3,477,227 | 11/1969 | Bettega | 60/309 |
| 4,118,173 | 10/1978 | Shakiba | 138/40 |
| 4,206,600 | 6/1980 | Feuling | 60/312 |
| 4,589,852 | 5/1986 | Price | 60/309 |

FOREIGN PATENT DOCUMENTS 2134979 8/1984 United Kingdom ................ 60/309

Primary Examiner—Douglas Hart
Attorney, Agent, or Firm—Watts Hoffmann Fisher & Heinke

[57] ABSTRACT

An anti-moisture device for removing moisture droplets from an interior surface of a duct, characterized by an outer edge secured to the interior surface of the duct, an inner edge surrounding an opening, and a connecting wall between the outer edge and the inner edge. The inner edge of the anti-moisture device is positioned closer to a downstream end of the duct than the outer edge whereby the connecting wall is positioned at an angle relative to the interior surface of the duct. Moisture droplets traveling upstream will be caught between the connecting wall and the interior surface of the duct, on the downstream side of the device. The connecting wall is dimensioned so that a turbulent disturbance will be created along the interior surface of the duct whereby moisture droplets will be removed. The anti-moisture device is preferably made of a thermally conductive material so that moisture droplets contacting the device will be flashed into steam, or vaporized.

12 Claims, 2 Drawing Sheets

ANTI-MOISTURE DEVICE FOR ENGINE EXHAUST

FIELD OF THE INVENTION

This invention relates generally to engines and engine exhaust systems, and more particularly to anti-moisture devices for reducing wear and/or damage to engines due to moisture in the engine exhaust system. The invention is especially related to marine engines and exhaust systems therefor to reduce or to eliminate wear and/or damage due to moisture therein.

BACKGROUND OF THE INVENTION

Boats, cars, and other machines commonly include engines for the combustion of fuel and engine exhaust systems for exhausting the resulting combustion gas (also referred to herein as exhaust gas). A typical exhaust system will include a duct having an upstream end communicating with the engine and a downstream end communicating with an exhaust vent. The exhaust vent allows the combustion gas to be discharged and dispersed into an environment external of the engine.

One example of a problem that has occurred in marine engines is premature wearing of the engine and even "freezing up" of the engine. For example, an engine that has had relatively little use may be "frozen" and not work following a relatively short time since the last successful use, say even as short as one week. As is described further below, this problem appears now to be due to corrosion at the exhaust valves in the engine and or in other parts of the engine due to moisture that undesirably enters the engine. It now has been found that moisture droplets creep upstream in the engine exhaust duct even during engine operation and can enter the engine and cause damage. In fact, it has been found that especially in high performance engines the pressure wave occurring in the exhaust system may reflect, as wave functions can do particularly under appropriate tuned conditions, to carry moisture upstream along the duct walls, thus further exacerbating the moisture problem particularly in a marine engine where there are multiple sources of such moisture (that generated by the combustion process, that due to cooling water about and/or entering the exhaust duct, and/or that in which the boat is floating). The present invention is useful to overcome such problems, as will be described in greater detail below.

Also, marine engines typically route exhaust gases vertically upward a distance to form a "trap" above the water and to prevent sea water from entering the engine, unlike automotive applications which exhaust downward. This vertical upward orientation allows condensation to fall by gravity or to be pulled by exhaust pulsing back into the engine. The invention is useful to solve engine problems due to such moisture, too.

The engine combustion gas will usually include water products which commonly show themselves as moisture droplets in the exhaust duct. At least minor entry of water products or moisture droplets into an engine is believed to occur each time it is turned off. The water products entering the engine may warp exhaust valves, freeze rings, and produce other problems which generally corrode and reduce the life of the engine. In fact, entry of water products into engines of marine machines is believed to be a major cause of wear and premature mortality of marine engines. The severity of the problems caused by moisture droplets depends on many factors including exhaust pipe temperature, cam overlap, time at idle speed and lapse between engine uses (soak time). The more common use of high lift overlap cams in recent years has accentuated the problems caused by entry of the moisture droplets into the engine.

Many factors may contribute to the formation of moisture droplets in an engine exhaust system. For instance, combustion gas traveling in an exhaust duct usually has a flow profile which is parabolic in shape, the flow of the combustion gas near the interior, surface of the duct being slower than at the center of the duct. The moisture droplets tend to accumulate along the interior surface of the exhaust duct due to this flow profile. Additionally, moisture in the air used in the combustion of fuel may also contribute to the formation of water products, or moisture droplets. Still further, some engines include jackets which circulate water for cooling the engine itself and/or parts of the exhaust system. The cooling water exits the jacket downstream of the engine where it may be introduced into the exhaust system for mixing with the exhaust gases and subsequent discharge. Since the exhaust gases and/or exhaust duct may be too cool at that point of water introduction, such water may not turn to steam that would easily flow out with the combustion gases and therefore may be a source of water that enters to the engine.

It now has been found that some of the moisture occurring in an exhaust duct may creep or flow back upstream in the exhaust system against the flow of the combustion gases. Such upstream flowing moisture now has been found to be the source of corrosion problems in the area of the engine itself.

To minimize the entry of water products into engines, for example, those used in cars, trucks, etc., the downstream end of the exhaust duct may be positioned "lower" than the engine and upstream end of the exhaust duct. For example in cars and similar vehicles, the engine usually is mounted at a relatively high location for clearance above the road surface. The downstream end of the exhaust duct (i.e , the tail pipe) is usually located below the upstream end of the duct. Thus, gravity encourages the moisture droplets to flow towards the downstream end of the exhaust duct and exit from the engine exhaust system.

The positioning of the downstream end of the exhaust duct "lower" than the upstream end, as is common in cars, is not typical in some machines. For example, in marine machines such as boats, this positioning is usually not preferred. Instead, a boat engine (also referred to as marine engine) is usually mounted relatively low, usually below the water line of the boat, to maintain a low center of gravity. The exhaust duct often is mounted so that its downstream end is above the water line when the boat is moving under power whereby combustion gas will vent to the air rather than the water. Such a mounting arrangement will result in the downstream end of the exhaust duct being at a higher vertical position than the engine and the upstream end of the duct.

When the downstream end of the exhaust duct is higher than the upstream end, the combustion gas must flow upwardly when exiting the engine exhaust system. In this situation, gravity may encourage the moisture droplets to flow towards the upstream end of the exhaust duct and fall into the engine. Specifically, when the engine is turned off (and the flow of combustion gas ceases), gravity may pull the moisture droplets in the exhaust duct into the engine. Additionally, at idle and slow speeds, water condensation which forms on the cooled exhaust duct surface and that and/or other water in the exhaust system may travel into the engine through the exhaust valves. Still further and as was mentioned above, moisture droplets sometimes experience "back flow" in the exhaust duct, i.e., a tendency to creep upstream towards the engine even while the engine is operating, especially with engines having high overlap cams.

Thus, there is a need to reduce wear and/or damage to an engine due to water products in the engine exhaust system.

SUMMARY OF THE INVENTION

The present invention provides an anti-moisture device for reducing wear and/or damage to an engine due to water products in the engine exhaust system. To accomplish this reduction, the anti-moisture device performs at least three fundamental functions when assembled in an exhaust duct. First, the device will block moisture droplets traveling upstream along the exhaust duct walls in an exhaust duct and thus prevent the droplets from entering the engine. Second, the device will flash to steam moisture droplets contacting it thereby the steam may be carried downstream, away from the engine, by the major portion of the flow. Third, the device will cause a turbulent disturbance along the interior surface of the duct. This turbulent disturbance will encourage moisture droplets accumulated on the interior surface of the exhaust duct to mix into the major portion of the flow.

More particularly, according to one aspect of the invention, an anti-moisture device for a duct in which a fluid containing water products may undergo fluid flow from an upstream end of the duct to a downstream end of the duct is provided. The anti-moisture device includes a blocking component which is positioned with respect to the duct for blocking a back flow of water products in a direction towards the upstream end of the duct. The anti-moisture device also includes a passing element for non-restrictively passing the fluid flow while the blocking component blocks the back flow of water products.

According to another aspect of the present invention, an anti-moisture device for a duct through which fluid containing water products may undergo fluid flow from an upstream end of the duct to a downstream end of the duct is provided. The anti-moisture device includes a turbulent causing component positioned with respect to the duct for causing a turbulent disturbance in the fluid flow. The device also includes a component for non-restrictively passing the fluid flow while the turbulent causing component causes the turbulent disturbance.

According to another aspect of the present invention, an anti-moisture device for a duct through which fluid containing water products may undergo fluid flow from an upstream end of the duct to a downstream end of the duct is provided. The anti-moisture device includes a component for evaporating water products of contact and allowing a non-restrictive passage of the fluid flow while the evaporation is taking place.

For example, preferably the anti-moisture device is made of a material that is a relatively poor conductor of heat but is able to be heated and to remain relatively hot for a relatively long period of time. An exemplary such material is stainless steel. The temperature of such device, then, preferably is adequate to cause moisture that engages such material to flash to steam which then may be more easily carried downstream with the flowing combustion gas.

According to another aspect of the present invention, an exhaust system is provided. The exhaust system includes a source of fluid flow, an exhaust vent, a duct including an interior surface forming a passage through which a fluid may flow from the source to the exhaust vent, and a component for causing a turbulent disturbance in a portion of the fluid flow adjacent the interior surface of the duct.

According to another aspect of the present invention, an exhaust system is provided which includes a source of fluid flow, an exhaust vent, a duct, and a blocking component. The duct forms a passage through which a fluid may flow from the source to the exhaust vent. The blocking component blocks the back flow of water products in a direction towards the upstream end of the duct.

According to another aspect of the present invention, an exhaust system is provided. The exhaust system has a source of fluid flow, an exhaust vent, a duct forming a passageway through which fluid may flow from the source to the exhaust vent, and a component for evaporating water products upon contact.

According to another aspect of the present invention, an engine system is provided including an engine producing fluid flow, a duct, an exhaust vent, and a blocking component. The duct forms a passageway through which the fluid may flow from the engine to the exhaust vent. The blocking component blocks the back flow of water products in a direction towards the engine.

According to another aspect of the present invention, an engine system is provided including an engine producing fluid flow, an exhaust vent, a duct forming a passage through which a fluid may flow from the engine to the exhaust vent, and a component for causing a turbulent disturbance in the fluid flow.

According to another aspect of the present invention, an engine system is provided including an engine producing a source of fluid flow, an exhaust vent, and a duct forming a passage through which a fluid may flow from the engine to the exhaust. The engine system includes a component for evaporating water products upon contact and at the same time allowing a majority of the flow to travel in an upstream direction.

To the accomplishment or the foregoing related ends, the invention, then, comprises the features hereinafter fully described and particularly pointed out in the claims, the following description in the annexed drawings setting forth in detail a certain illustrative embodiment of the invention, this being indicative, however, of but a few of the various ways in which the principles of the invention may be employed.

BRIEF DESCRIPTION OF THE DRAWINGS

In the annexed drawings

DETAILED DESCRIPTION OF THE INVENTION

Figure 1:
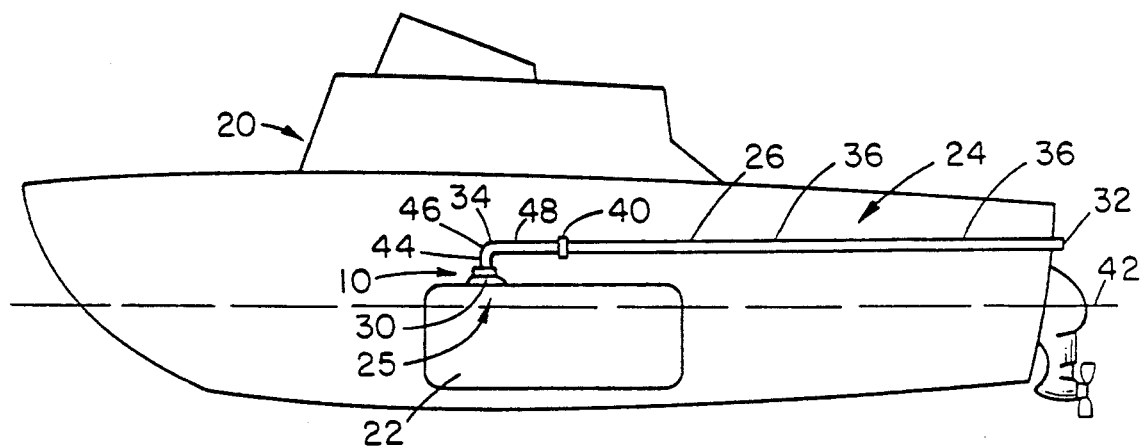
FIG. 1 is a schematic illustration of an engine of an exhaust system of a boat.

Referring now to the drawing wherein like numerals designate like parts, and initially to FIG. 1, an anti-moisture device 10 is shown assembled on a boat 20 in the engine 22 and exhaust system 24 thereof. The anti-moisture device 10 reduces near and/or damage to an engine due to water products in the engine exhaust system. Specifically, the anti-moisture device 10 preferably performs three principal functions when assembled in an exhaust duct. First, the device 10 will block moisture droplets traveling upstream in an exhaust duct and thus prevent the droplets from entering the engine. Second, the device 10 will flash to steam moisture droplets contacting it whereby the steam may be carried downstream, away from the engine, by the major portion of the flow. Third, the device 10 will cause a turbulent disturbance along the interior surface of the duct. This turbulent disturbance will encourage moisture droplets accumulated on the interior surface of the exhaust duct into the major portion of the flow.

Turning now briefly to details of the boat 20, it includes the engine 22 and exhaust system 24. The engine 22 burns hydrocarbon fuel and produces combustion gas containing water products. The exhaust system 24 includes an exhaust manifold 25 and a duct 26 forming a passage through which the combustion gas may flow from the manifold 25 to an exhaust vent 28 for discharge to an external environment, such as the atmosphere.

The duct 26 may have a generally constant cross-sectional area; in a typical example the duct 26 has a generally circular constant cross-sectional area. The duct 26 has an upstream end 30 communicating with the exhaust manifold 25 and a downstream end 32 connected to (or forming) the exhaust vent 28. The duct 26 will usually include an exhaust pipe 34 connected to a tail pipe 36 by a flange 40. In the illustrated embodiment, the exhaust pipe 34 includes a section 44 extending vertically upward from the exhaust manifold 25 and a 90 degree turn 46 joining with a horizontal section 48 of the exhaust pipe. The tail pipe 36 extends generally in a horizontal direction and is co-linear with the horizontal section of the exhaust pipe 34. As can be seen in FIG. 1, the downstream end 32 of the duct 26 is positioned above the water line 42 whereby the combustion gas may exit to the atmosphere. This positioning results in the downstream end 30 of the duct 26 being above or "uphill" from the upstream end 32 where it connects to the exhaust manifold 25. The exhaust duct 26 also may be surrounded over at least part of the length thereof by a conventional water-cooled jacket (not shown) that provides a cooling function, for example, to prevent strain and for safety reasons.

Figure 2:
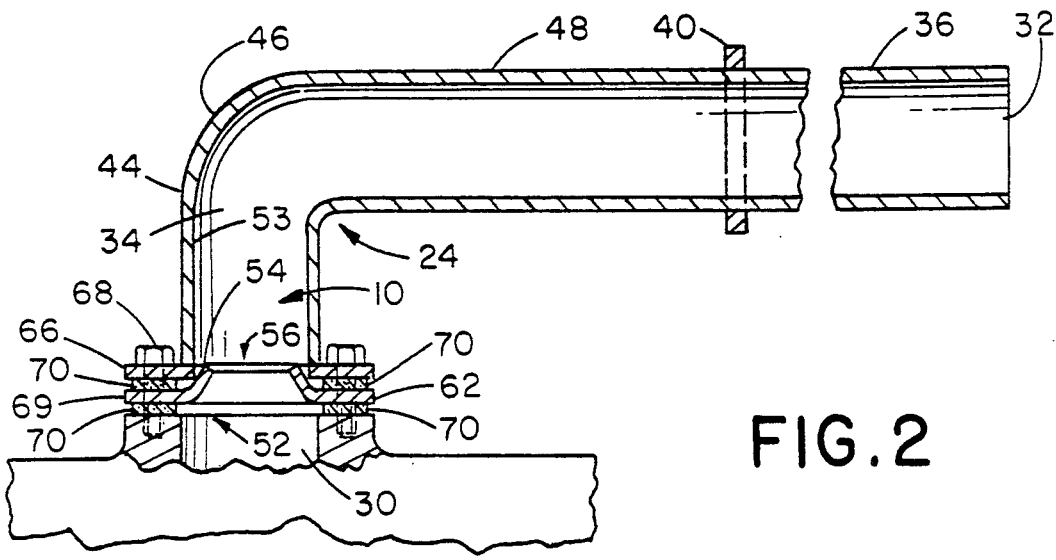
FIG. 2 is an enlarged view of the exhaust system of FIG. 1 with an anti-moisture device according to the present invention installed.
Figure 3:
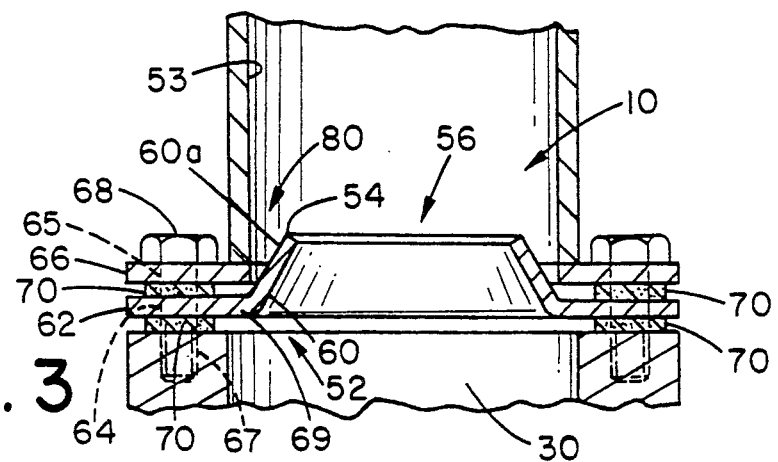
FIG. 3 is an isolated side view of the anti-moisture device of FIG. 2.
Figure 4:
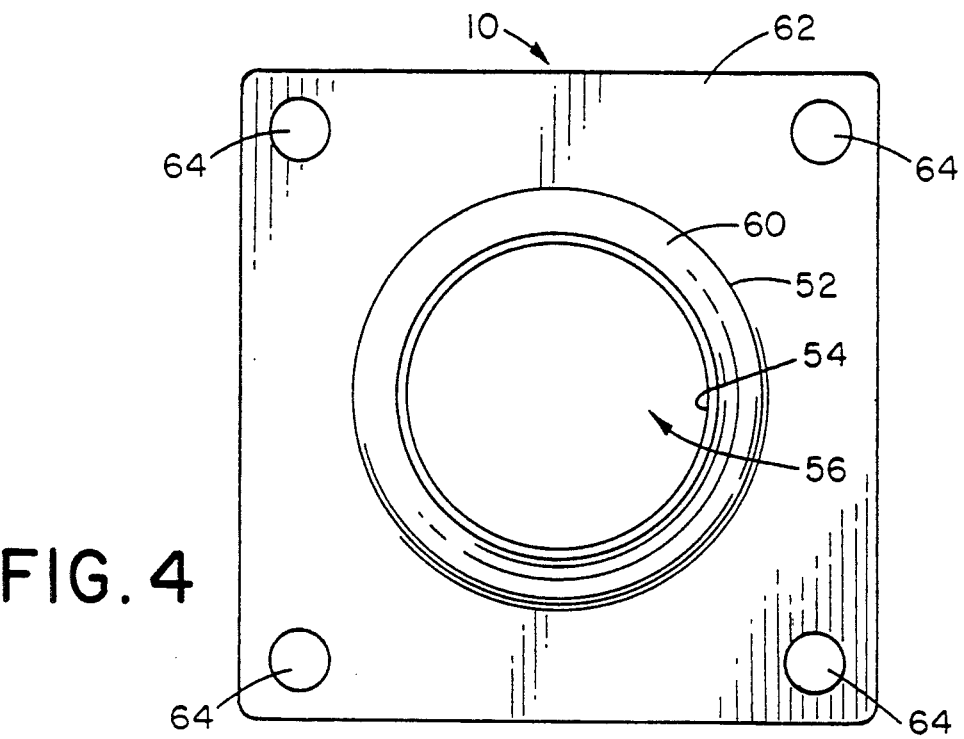
FIG. 4 is an isolated front view of the anti-moisture device of FIG. 2.

Referring additionally to FIGS. 2 and 3, an anti-moisture device 10 according to the present invention is shown installed in an exhaust system 24. The anti-moisture device 10 is positioned in the duct 26, preferably fixedly mounted between the exhaust pipe 34 and the exhaust manifold 25. In the illustrated embodiment, the anti-moisture device 10 is positioned upstream from the 90 degrees turn 46 in the exhaust manifold 34 at the lower end of the vertical section 44 of the exhaust pipe 34. If desired, the anti-moisture device 10 may be placed elsewhere in the duct 26; preferably such placement allows the device 10 to perform the various functions described herein.

The anti-moisture device 10 has an outer edge 52 abutted to an interior surface 53 of the duct 26. The anti-moisture device 10 also has an inner edge 54 which surrounds an opening 56. Between the inner edge 54 and the outer edge 52 is a connecting wall 60. The device 10 may be formed by a stamping process, whereby it is stamped from a flat piece of metal stock material that forms a square frame 62. The device 10 also may be made by a different process. One example is by a casting process. Also, preferably the device 10 is made of stainless steel which typically does not corrode or rust and which has desired strength, temperature withstanding and low thermal conducting characteristics. However, as will be appreciated, other metal or other materials that have satisfactory characteristics to withstand the exhaust duct environment and to provide the operative functions described herein also may be used.

The opening 56 is centrally located on the frame 62 in the illustrated embodiment. Also, preferably in each of the four corners of the frame 62 is a hole 64. Also, holes 65 in a flange connector 66 of the exhaust pipe 34 and threaded holes 67 in the exhaust manifold 25 are used to connect the exhaust pipe to the exhaust manifold using bolts 68 generally in the manner illustrated in FIGS. 2 and 3. Preferably the frame 62 of the device 10 is coextensive with the flange connector 66 and with the exhaust manifold surface 69 in which the holes 67 are formed to be secured between the flange connector 66 and the surface 69 in a manner that provides sealed interfaces therebetween without leaking exhaust. (If desired appropriate gaskets 70 and/or other means to seal such interfaces between the frame 62 of the device 10 and the flange connector 66 and the surface 69, respectively, may be employed) The holes 64 in the frame 62 align with the holes 65, 67 so that the bolts 68 can be tightened through and into such respective holes to secure the exhaust pipe 34 and device 10 to the exhaust manifold 25. In this manner the device 10, exhaust pipe 34 and manifold 25 may be secured together; however, other techniques may be used equivalently to secure the device 10 to the engine 22 and/or exhaust system 24, depending on desired placement of the device 10 and the configuration of the various parts to which it is connected.

The surface area, more particularly the projection of the surface area of the connecting wall 60 on the open cross sectional area of the duct 26 transverse to the flow direction of the combustion gas is substantially less than the cross sectional area of the duct 26. For example, the cross sectional area of the duct 26 may be at least ten times greater than the cross sectional area of the projected area of the wall 60 of the anti-moisture device 10. The anti-moisture device 10 is not intended to restrict the flow of combustion gas therethrough; rather it is intended to provide a non-restrictive (vis-a-vis flow) change in the duct diameter and, therefore, slightly to upset the flow profile of the combustion gas, more specifically to cause a turbulence in the flow particularly at the wall 53 of the duct downstream of the device 10. The ability of the device 10 to avoid providing a flow restriction effect is due to the fact that in most cases the cross sectional area of the opening of the exhaust manifold 25 and the corresponding opening in the flange connector 66 of the exhaust pipe is larger than necessary to conduct the flow of combustion gases therethrough.

The inner edge 54 of the device 10 is positioned closer to the downstream end 32 than the outer edge 52 of the device. Thus the connecting wall surface 60 is positioned at an angle 80 relative to the interior surface 53 of duct 26. The angle 80 is Preferably less than 35 degrees, more preferably between 27 degrees and 31 degrees, and even more preferably approximately equal to 27 degrees. Accordingly, the surface 60 forms a hollow truncated conical shape in the illustrated preferred embodiment, the narrower diameter portion (apex) of such truncated cone being relatively downstream of the base.

The anti-moisture device 10 is preferably made of a thermally conductive material such as metal, metal alloy or some other material. More preferably the device 10 is made of stainless steel, to resist corrosion or other damage thereto. Because stainless steel has a lower thermal conductivity when compared to other metals and metal alloys, after being heated by the combustion gases flowing thereby the device 10 will remain hot enough to flash the moisture droplets to steam without sacrificing the longevity of the device. Preferably such heat or temperature is maintained even in the presence of a cooling water flow over the exterior of the device 10 and other parts of the exhaust system, this being due to the preferred poor thermal conductivity of the device 10.

The anti-moisture device 10 removes water products or moisture droplets, from the interior surface of the duct in three ways. First, moisture droplets traveling upstream along the interior surface 53 of the duct will be caught between a downstream facing surface portion 60a of connecting wall 60 and the interior surface 53 of the duct, e.g., within angle 80. Second, because the anti-moisture device 10 becomes hot due to the hot combustion gas flowing past it, moisture droplets hitting the device 10 will be flashed to steam, which then will easily flow downstream with the other combustion gases. Third, the anti-moisture device 10 creates a turbulent disturbance along the interior surface of the duct upstream from the device.

Figure 5:
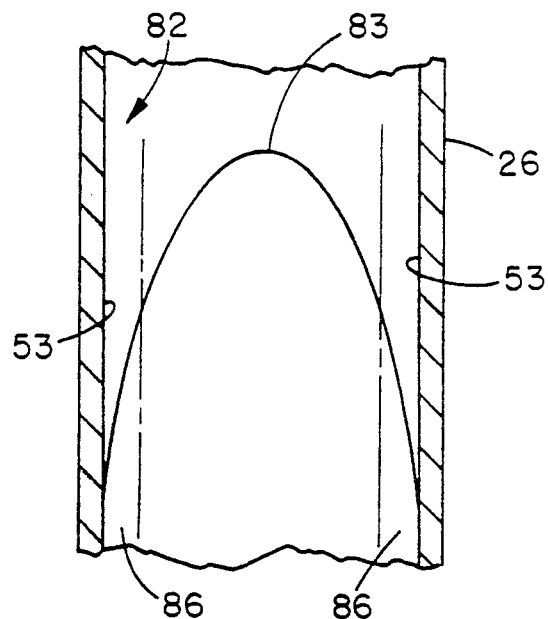
FIG. 5 is a schematic illustration of a velocity profile of a fully developed flow in a duct having constant cross sectional area.
Figure 6:
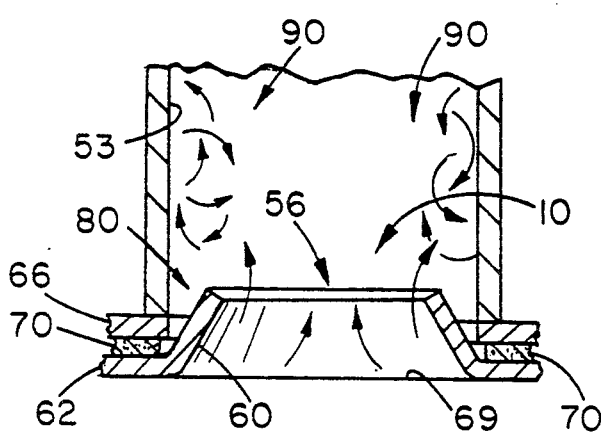
FIG. 6 is a schematic illustration of a velocity profile of flow past the anti-moisture device of the present invention.

The third turbulent disturbance aspect of the anti-moisture device 10 is perhaps best explained by referring to FIGS. 5 and 6. In FIG. 5, a velocity profile 82 of a fully developed flow in the duct 26 is illustrated particularly in the absence of the device 10 or so far downstream of a device 10 as to be unaffected directly by such device 10. The profile 82 is parabolic in shape and the velocity is greatest at the center 83. The velocity of the flow 82 approaches zero towards the interior surface 53 of the duct 26. The layer immediately adjacent to the interior surface 53 adheres to it, or in other words, the tangential velocity at the surface 53 is substantially zero. In a transitional region near the surface, the velocity increases from zero to the velocity of the flow stream. This transitional region is commonly called the boundary layer of the flow profile. At a portion 86 of the boundary layer the velocity is not great enough to sweep or to wipe away moisture droplets. For this reason, the droplets tend to accumulate along the interior surface 53 of the duct 26. In fact, it has been discovered by using strobe light techniques to observe the interior of the exhaust duct that moisture droplets in this region can actually travel upstream towards the engine.

A velocity profile of a flow in the duct 26 with anti-moisture device 10 installed is illustrated in FIG. 6 in the vicinity of the device 10 The anti-moisture device 10 disturbs flow of combustion gas flowing therethrough especially at the portion 86 of the boundary layer, whereby a turbulent flow pattern 90 is created. Moisture droplets accumulating on the interior surface 53 of the duct 26, then, are wiped away either by the turbulent flow pattern 90 itself or are thrown into the central region of the duct 26 to be carried downstream by the central faster flowing portion of the combustion gas flow.

The anti-moisture device 10 may be strategically positioned along the length of the exhaust system 24 so that it does not cause any loss of power. The exhaust gas or combustion gas flow in the exhaust system often has a characteristic of a wave function (such as a compression wave) due to pressure pulsations occurring as the engine operates and the exhaust valve(s) open and close. In a preferred embodiment the device 10 can be located approximately at a quarter wavelength distance from the exhaust valve(s). At this location the device 10 may cause a sharper reflection (of the exhaust compression wave) due to its configuration thus to help overcome the reflections of the exhaust compression waves in a high performance engine and also may avoid interfering with flow therethrough that might otherwise dissipate engine power and may result in improved operation efficiency of the device 10 for its intended moisture blocking or eliminating function.

One can appreciate from the foregoing description that the anti-moisture device 10 may be used on boat (marine) engine exhaust systems and other engine exhaust systems. Additionally, the anti-moisture device 10 may be used in any duct in which the removal of moisture droplets from the interior surface of the duct is desired. The anti-moisture device 10 may also be used to create a turbulent disturbance to sweep away particles other than moisture droplets undesirably accumulating on an interior surface of a duct. Furthermore, the anti-moisture device 10 can be altered to accommodate ducts of other shapes, for example, ducts having polygonal or elliptical cross sectional shapes.

Although the invention has been shown and described with respect to a certain preferred embodiment, it will be clear that equivalent alterations and modifications will occur to others skilled in the art upon the reading and understanding of this specification. The present invention includes all such equivalent alterations and modifications, and it is intended to be limited only by the scope of the following claims

What is claimed:

1. In a marine propulsion system including a motor and an exhaust system including a manifold and a duct extending upwardly from the motor, the improvement consisting of an anti-moisture device in said exhaust system above the motor for preventing return flow of moisture, said device comprising an interior wall projecting upwardly away from said motor to form an acute included angle with a surrounding wall of said exhaust system, and a central hole in said interior wall sized to minimize restriction to exhaust gases in said exhaust system, said interior wall serving to form a trap for moisture and to create a turbulent flow pattern along an adjacent wall surface of said exhaust system.

2. The improvement as claimed in claim 1 wherein said interior wall of said device defines a frusto-conical shape.

3. The improvement as claimed in claim 1 or claim 2 wherein an area of said central hole is at least 90% of an area within said surrounding wall of said exhaust system.

4. The improvement as claimed in claim 1 or claim 2 wherein said interior wall forms an included angle of between 27° and 31° with said surrounding wall of said exhaust system.

5. The improvement as claimed in claim 1 or claim 2 wherein said interior wall is made of a material selected to retain heat from exhaust gases in said exhaust system, whereby moisture contacting said interior wall is vaporized.

6. In a marine propulsion system including a motor and an exhaust system including a manifold and a water cooled duct having a portion extending upwardly from the motor, the improvement consisting of an anti-moisture device in said exhaust system above the motor for preventing return flow of moisture, said device including a frame portion by which said device is secured in place and an interior wall extending from said frame portion toward an interior of the duct and upwardly of said motor to form an acute included angle with a surrounding wall of said exhaust system, a central hole in said interior wall sized to minimize restriction of exhaust gases flowing through said hole, said interior wall serving to form a trap for moisture and to create a turbulent flow pattern along an adjacent wall surface of said exhaust system, said interior wall being made of a metal selected to retain heat from exhaust gases in said duct, whereby moisture droplets contacting said interior wall are vaporized to steam, and gasket means between said frame portion and said duct.

7. The improvement as claimed in claim 6 wherein said interior wall forms a frusto-conical shape having a base at said frame portion and a smaller end spaced from said base and defining said hole.

8. The improvement as claimed in claim 6 or claim 7 wherein said hole is at least 90% of an area of said surrounding wall of said exhaust system.

9. An anti-moisture device adapted to be inserted in an exhaust system of a marine propulsion system above a motor for preventing return flow of moisture comprising a frame portion and a wall projecting from a face of said frame portion and forming a hollow tapered shape having a base at said frame portion and a hole in a smaller end spaced from said base, said hole being sized to minimize flow restriction of exhaust gases and having an area which is at least 90% of and area of said base.

10. The device of claim 9 wherein said frame portion and said wall are a one-piece member made of stainless steel, whereby said device will retain heat from exhaust gases when inserted in said exhaust system so as to vaporize moisture droplets that contact it.

11. The improvement as claimed in claim 1 or claim 2 wherein said device extends into said duct.

12. The improvement as claimed in claim 6 or claim 7 wherein said device extends into said duct.

* * * * *